(12) United States Patent
Menei

(10) Patent No.: US 9,656,337 B2
(45) Date of Patent: May 23, 2017

(54) DEBURRING APPARATUS WITH DRIVING MEANS FOR ROTATABLY AND REVERSIBLY DRIVING THE APPARATUS TO AND AWAY OF A BILLET

(71) Applicant: PRIMETALS TECHNOLOGIES AUSTRIA GMBH, Linz (AT)

(72) Inventor: Paolo Menei, Legnano (IT)

(73) Assignee: Primetals Technologies Austria GmbH, Linz (AT)

(\*) Notice: Subject to any disclaimer, the term of this patent is extended or adjusted under 35 U.S.C. 154(b) by 59 days.

(21) Appl. No.: 14/435,221

(22) PCT Filed: Sep. 27, 2013

(86) PCT No.: PCT/EP2013/070261
§ 371 (c)(1),
(2) Date: Apr. 13, 2015

(87) PCT Pub. No.: WO2014/056741
PCT Pub. Date: Apr. 17, 2014

(65) Prior Publication Data
US 2015/0231714 A1    Aug. 20, 2015

(30) Foreign Application Priority Data

Oct. 12, 2012  (EP) ................................ 12425167

(51) Int. Cl.
*B23D 79/02* (2006.01)
*B23K 37/08* (2006.01)
(Continued)

(52) U.S. Cl.
CPC ........ *B23D 79/021* (2013.01); *B22D 11/1265* (2013.01); *B23D 79/04* (2013.01);
(Continued)

(58) Field of Classification Search
CPC ...... B23C 2220/08; B23D 79/00; B23D 1/10; B23D 13/02; B23K 11/04; B21B 15/00;
(Continued)

(56) References Cited

U.S. PATENT DOCUMENTS 4,047,470 A * 9/1977 Lorenz ..................... B23C 3/14
409/157
4,119,015 A   10/1978 Tuda et al.
(Continued)

FOREIGN PATENT DOCUMENTS

| CH | EP 0023984 A1 * | 2/1981 | ............. B23Q 11/02 |
|---|---|---|---|
| CN | 2460246 Y | 11/2001 | |
| CN | 201524945 U | 7/2010 | |
| DE | 2803048 A1 * | 8/1979 | ............. B23Q 11/02 |
| DE | 3044832 A1 | 7/1982 | |
| EP | 1057563 A1 | 12/2000 | |
| GB | 367239 A * | 2/1932 | ............. B23K 37/08 |

(Continued)

*Primary Examiner* — Sunil K Singh
*Assistant Examiner* — Nicole N Ramos
(74) *Attorney, Agent, or Firm* — Laurence A. Greenberg; Werner H. Stemer; Ralph E. Locher

(57) ABSTRACT

An apparatus for removing burrs on billets has a supporting element and at least two arms extending from the supporting element. Deburring devices are driven in rotation by burrs of billets. The deburring devices are supported by the arms. The apparatus is driven rotatably and reversibly by a drive between a stand-by position wherein the apparatus is spaced apart from the billet to be deburred and a working position wherein the deburring devices are close to the billet to be deburred and are able to contact a burr.

17 Claims, 11 Drawing Sheets

(51) Int. Cl.
  *B22D 11/126* (2006.01)
  *B23D 79/04* (2006.01)
  *B23Q 11/02* (2006.01)

(52) U.S. Cl.
  CPC .......... *B23K 37/08* (2013.01); *B23C 2220/08* (2013.01); *B23Q 11/02* (2013.01); *Y10T 409/3042* (2015.01); *Y10T 409/304256* (2015.01); *Y10T 409/50328* (2015.01); *Y10T 409/501968* (2015.01)

(58) Field of Classification Search
  CPC ........... B23Q 11/02; Y10T 409/501476; Y10T 409/501968; Y10T 409/50328; Y10T 409/505084; Y10T 409/506724; Y10T 83/7487
  See application file for complete search history.

(56) References Cited

U.S. PATENT DOCUMENTS 4,978,259 A * 12/1990 Wollam .................... B23C 3/12
 407/7
6,296,428 B1 * 10/2001 Yamashita ................ B23C 3/12
 409/293
6,648,564 B2  11/2003 Yamashita et al.

FOREIGN PATENT DOCUMENTS

| JP | 07299654 A | 11/1995 | |
|----|------------|---------|---|
| JP | H11156636 A | 6/1999 | |
| JP | 2000102875 A | 4/2000 | |
| SK | EP 2570199 A1 * | 3/2013 | ............... B08B 1/00 |

* cited by examiner

DEBURRING APPARATUS WITH DRIVING MEANS FOR ROTATABLY AND REVERSIBLY DRIVING THE APPARATUS TO AND AWAY OF A BILLET

BACKGROUND OF THE INVENTION

Field of the Invention

The present invention relates an apparatus for removing burrs in a continuous rolling process wherein billets are joined together by welding.

In modern rolling mills, billets are welded together to be subsequently rolled. When the billets are welded to each others by flash butt welding, welding burrs are formed at the welded locations by the flash and pressure applied thereto. Since the welding burrs are relatively large, they act as flaws in the subsequent rolling operation carried out thereafter. During rolling of the welded billets, there is even a possibility that the rolled product is broken at the location of the flaws.

Accordingly, the welding burrs must be perfectly removed before billets rolling.

Document EP 1 057 563 discloses a method and a apparatus for deburring welded billets wherein cutting means located in vicinity of the surface to be cleaned are translated toward this surface to intercept the butt and perform the burr cut.

In this solution, during deburring, the cutter needs to be translated along the width of the billet to operate the cut. This implies driving mechanisms and therefore increases breakdowns causes.

When the solution of this document is carried out, the cutting means need to be cooled with sprayed water during the cut. This is because they are in contact with the hot billet which is at a temperature of approximately 950°. Given that even in stand-by position the cutter are close to the billet, they need to be cooled permanently to mitigate the irradiating heat coming from the billet.

This continued exposure to heat has a negative impact in term of durability of the mechanical parts and their mechanical properties. This results in frequent maintenance works and has a detrimental effect on the life of the wearing parts.

Furthermore, because of the narrow space, there is no way to clean the cutting means from metal chips that could stick on them, therefore, the potential risk that some chips fall on the billet thus generating defect in the rolled material is high.

Further, when the solution of this document is carried out, the number of cutting means in the Top/Bottom face deburrer is of 4 (2 for the upper face and 2 for the bottom one) and additional 4 in the side faces deburrer (2 on the left and 2 on the right side). 4 actuators (hydraulic cylinders) are installed in each deburring machine, and the total weight of the two machines is approximately 21 tons and the footprint for the installation of this system is approx 4 meter.

The arrangement of the cutting means in this existing solution implies:

Utilization of a cooling media, with related additional equipments in terms of pumping station, piping, draining system, water treatment, Corrosion due to utilization of water on heated steel components, Difficulties in replacing the worn cutting mean due to scale, Difficulties in replacing the worn cutting mean due to lack of access to these parts.

BRIEF SUMMARY OF THE INVENTION

The objectives of the present invention are to propose a solution to the above mentioned problems.

This objective is reached with an apparatus for removing burrs on billets comprising:
- a supporting element
- at least two arms extending from said supporting element,
- deburring means able to be driven in rotation by burrs of billets, the deburring means being supported by the arms,
- driving means for driving rotatably and reversibly the apparatus between a stand-by position wherein the apparatus is spaced apart from the billet to be deburred and a working position wherein the deburring means are close to the billet to be deburred and are able to contact a burr.

Thanks to the above mentioned features, the deburring means, for example cutting disks, are moved apart from the radiating heat surface of the billet when there is no need to perform a cut: they are exposed to the radiating heat of the hot material only during the time strictly necessary to perform the burr cut. This increases the lifetime of the apparatus and of course of the deburring means and thereby maintenance costs are reduced.

Furthermore, thanks to the invention, the deburring means are accessible in rest position and there is no need to have a spare unit of the deburring equipment. The change of the cutting tools can be operated on shadow with other line set-up activities. This means that the changes, repairing or servicing of the deburring apparatus are not disturbing the production or badly affecting the productivity or availability of the rolling mill as they occur while the line is stopped for other reasons (e.g. to set up the equipment due to product size change). This is possible because the deburring means are accessible and their replacement can be performed in a time that is shorter than the time needed to carry out other set-up in the rolling mill.

According to other features taken alone or in combination:
- the deburring means comprise:
- at least a horizontal idle cutting disks (34, 34') and,
- at least a vertical idle cutting disk (24, 24').
- the diameter of each disk is greater than the width of the face of the billet said each disk is adapted to deburr, the diameter being preferably at least two times greater, and more preferably comprised between 2 and 3.5 times said width.
- the arms are angularly spaced apart such that at the end of the rotation bringing the apparatus from the stand-by position to the working position, the deburring means are located in the vicinity of the surface of the billet to be deburred, and almost parallel to said surface.
- the apparatus further comprises means for indicating the exact position of a point E of the deburring means which will be firstly in contact with the burr and for stopping a motion of a cutting means.
- each of said indicating means comprises an idle stoppage wheel adapted to contact the billet.
- each deburring mean is slightly inclined relative to the face of the billet it is adapted to clean such that only a portion of the cutting means contact the burr.
- the apparatus further comprises means for translating each deburring means in a direction transverse to the travelling direction of the billet, the translation being for adjusting the position of the deburring means relative to a potential burr.

the apparatus further comprises a cleaning scraper attached to the external portion of a cutting disk support, said scraper being adapted to touch a portion the edge of one deburring means to clean this portion from chips of metal stuck during deburring.

the apparatus further comprises a cleaning brush attached to a cleaning arm secured to the supporting element, said brush being rotatable between a horizontal stand by position and a vertical cleaning position wherein said brush cleans a deburring mean.

the cleaning means further comprise a plate secured to an arm of the deburring apparatus and rotating with this arm when the apparatus is moving from the stand-by to the working position and vice-versa, said plate touching the brush, the rotation of the plate provoking rotation of the brush between said two positions.

the apparatus further comprises means for stopping accidental rotation of the apparatus provoked by an adjusting motion of the deburring means of another deburring apparatus, said stopping means being able to contact the billet (20) when the apparatus is in working position.

the stopping means comprise a stoppage wheel (46), the stopping wheel is attached to the supporting element and is located and adapted to contact (or touch) the billet in case of said accidental rotation.

The invention also concerns a deburring assembly comprising at least:

a first deburring apparatus as above defined and a second deburring apparatus as above defined Other advantages of the present invention will be readily understood from the following non-imitating specification and attached drawings wherein:

BRIEF DESCRIPTION OF THE SEVERAL VIEWS OF THE DRAWING

In the drawings the same reference sign is used for the same or similar elements.

DESCRIPTION OF THE INVENTION

Figure 1:
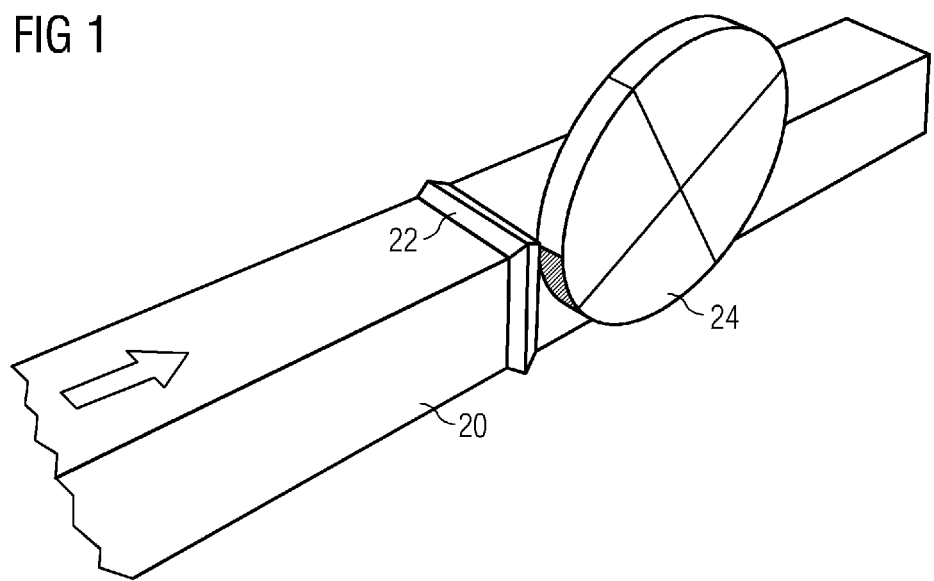
FIG. 1 is a schematic tridimensional view of the cutting principle used in the invention.

FIG. 1 is a schematic view showing how a burr 20 present on a welding location of two billets is cut. The apparatus according to the invention comprises an idle disk free to rotate around its axis when a proper torque is applied.

Figure 2:
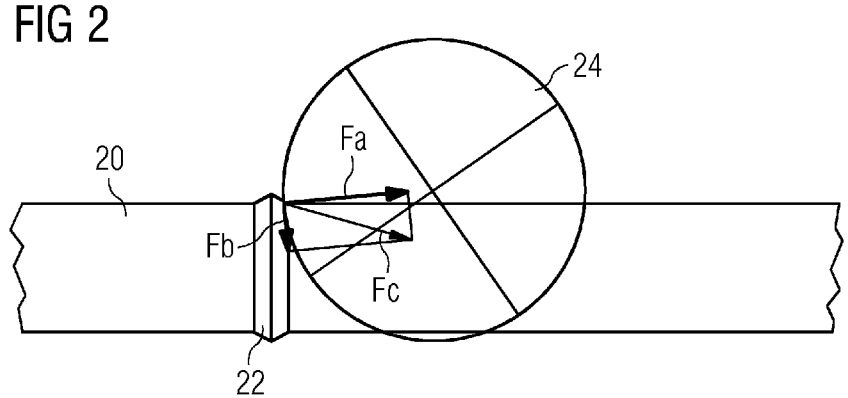
FIG. 2 is a longitudinal cross section of FIG. 1.

As can be seen on FIG. 2, the disk is located such that the reaction force that the cutting disk encounters when contacting the burr provokes the rotation of the disk. Therefore, no rotational driving mechanism for the cut is needed (as for example a motor). The reaction force Fc has a horizontal Fa and a vertical Fb component. The cutting disk torque is the product of the vertical component Fb of the reaction force by the cutting disk radius.

Furthermore, given that each cutting disk is idle and rotates only when it touches a burr or, in other words that the rotation speed of each cutting disk is the consequence of the billet speed, there is no need to adjust the billet speed to a cutting speed. This makes the system according to the invention less complex, from a process control and manufacturing point of view, than prior art systems which require the control of the billet speed. This also reduces breakdown causes.

As can be seen on FIG. 2, according to the invention, the diameter of the cutting disk is greater than the width of the billet to be deburred. For example, the width of a billet can vary between 100 and 160 mm whereas the cutting disk diameter can be 350 mm. In this way, according to the invention, only one disk is needed per billet face and no means of translating the disks along the width of the billet is needed.

Figure 3A:
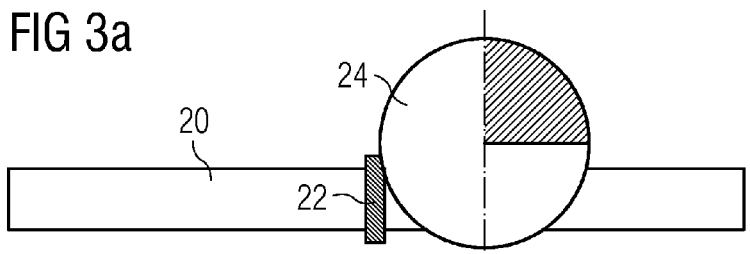
FIG. 3a-3e show a schematic sequencing of a deburring according to the invention.
Figure 3B:
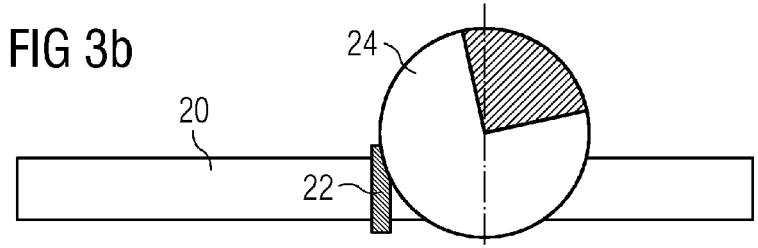
Figure 3C:
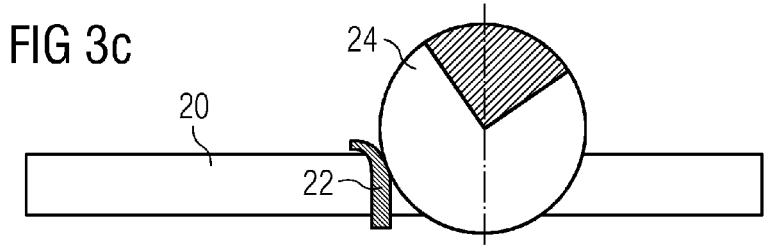
Figure 3D:
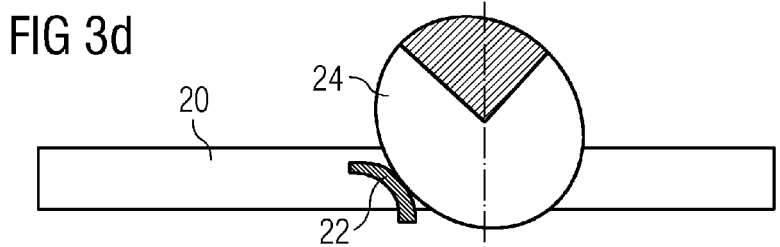
Figure 3E:
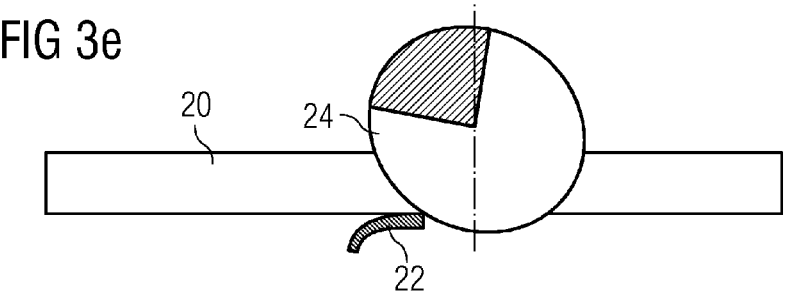

FIGS. 3a-3e give a deburring sequence. While the welded billet is moving forward (from left to right when watching FIG. 3) driven by pinch rolls (not shown), the burr 22 encounters the cutting edge of the cutting disk 24 (FIG. 3A). This provokes rotation of the cutting disk which in turn progressively cuts the burr 22 (FIG. 3b-3e). As already mentioned, the dimensions of the cutting mean have been designed to cover the full width of the billet therefore, at the beginning of the cut, a small portion of the burr is engaged with the cutting means and this portion increases while the billet is travelling toward the cutter mean.

Figure 4:
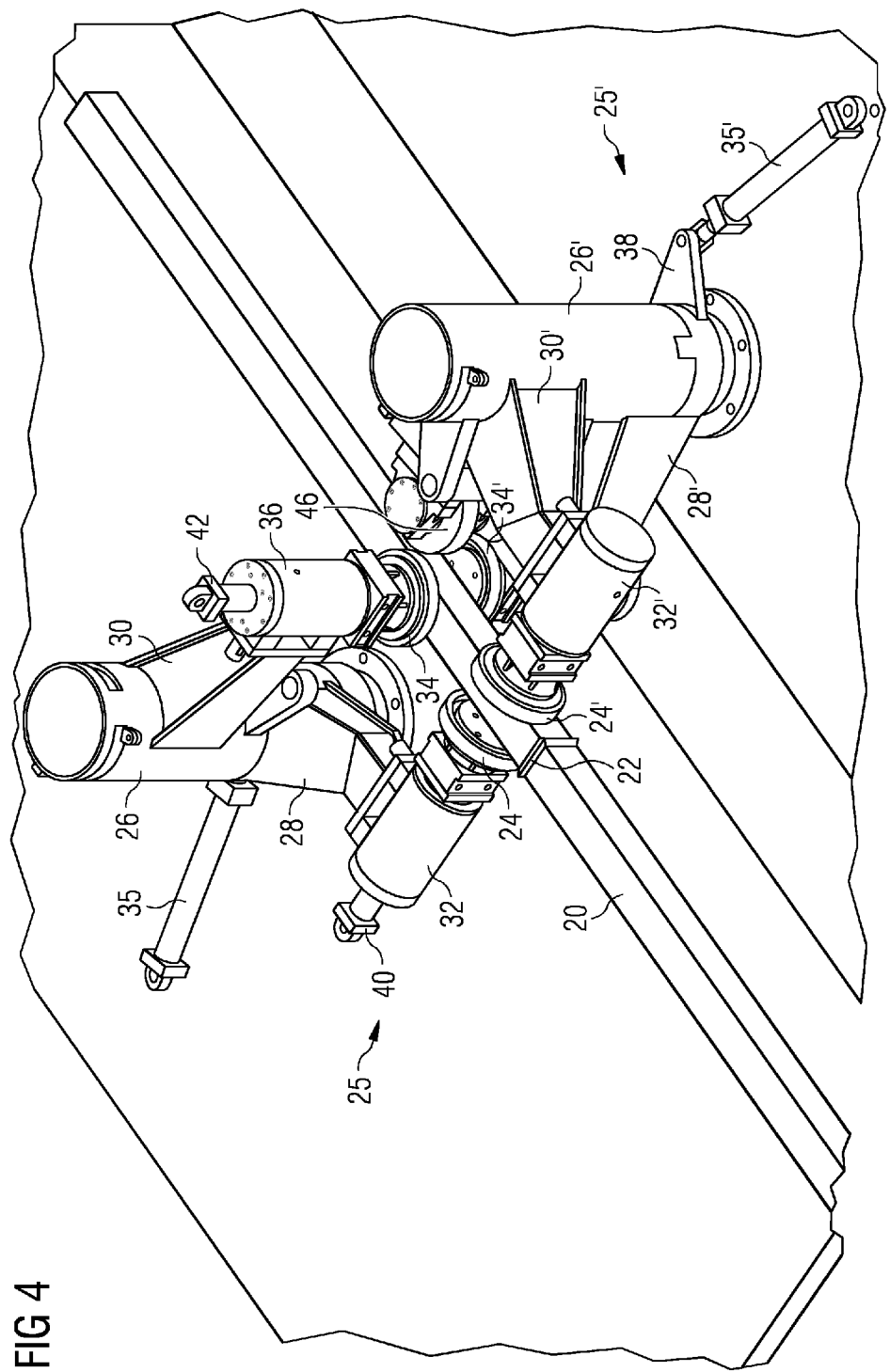
FIG. 4 is a tridimensional view of an assembly comprising two deburring apparatus according to a first embodiment of the invention, in a working position.

FIG. 4 is a view of an assembly of two deburring apparatus 25 and 25' (left and right when watching the figure) according to a first embodiment of the invention. Each deburring apparatus is adapted for being installed at both sides of the travelling billet 22. Each deburring apparatus comprises a supporting column 26, 26', extending upwardly from the ground of a rolling mill. Two arms 28, 28', 30, 30' extend from each support column 26, 26' of each deburring apparatus. Each arm is fixedly attached to its support column and rotates with said support column. Each arm 28, 28', 30, 30' supports in turn a cylindrical support 32, 32',36 (although they are 4, only 3 cylindrical supports are visible on FIG. 4) which in turn supports a cutting disk 24, 24',34' 34'. Each cutting disk is idle, this means that it can rotate freely about its own axis.

Each column 26, 26' is connected via a flange 38 to a hydraulic cylinder 35, 35'. Each hydraulic cylinder 35, 35' reversibly rotates its corresponding column about the axis of the column, between a stand-by position wherein the cutting disks 24, 24', 34; 34' are away from the billet 20 to be cleaned and a working position wherein the cutting disks are in the vicinity of the billet to be cleaned as shown in FIG.

4. Security means (not shown) to limit the rotation of the columns 26, 26', and avoid the damage of the billet, are also provided.

Each deburring apparatus 25, 25' has a horizontal 34, 34' and a vertical cutting disk 24, 24'. This feature allows deburring of all surfaces of the billet using only four cutting disks.

Furthermore, for each deburring apparatus, the assembly: arms 28, 30, 28', 30', cylindrical support 32, 36, 32'36' and cutting disk 24, 34, 24', 34' is designed such that once the rotation from waiting to working position has occurred, only a minimum of adjustment or no adjustment at all is needed for the cutting edge of a given disk to be in contact with the burr to cut.

One deburring apparatus 25 is provided with means for translating its cutting disks. For example, in the embodiment of FIG. 4, two hydraulic cylinders 40, 42 are provided. Each cylinder translates a corresponding cutting disk 24, 34, in order to make the disks contact the burr.

According to the invention one deburring apparatus 25', is provided with a horizontal stopping wheel 46 which is attached to the column 26' and rotate with this column. In normal working position this stopping wheel is located close to the billet but does not touch the billet. This stopping wheel is designed to stop an accidental anti-clockwise rotation of the deburring apparatus 25' caused by a adjusting translation of the lateral (also called vertical) cutting disks 24 of the other deburring apparatus 25, which would stroke the billet 20. In this case, rotation of the deburring apparatus 25' is stopped by the wheel 49 which contacts the billet 20 and this blocks further rotation of the deburring apparatus 25'.

Figure 5:
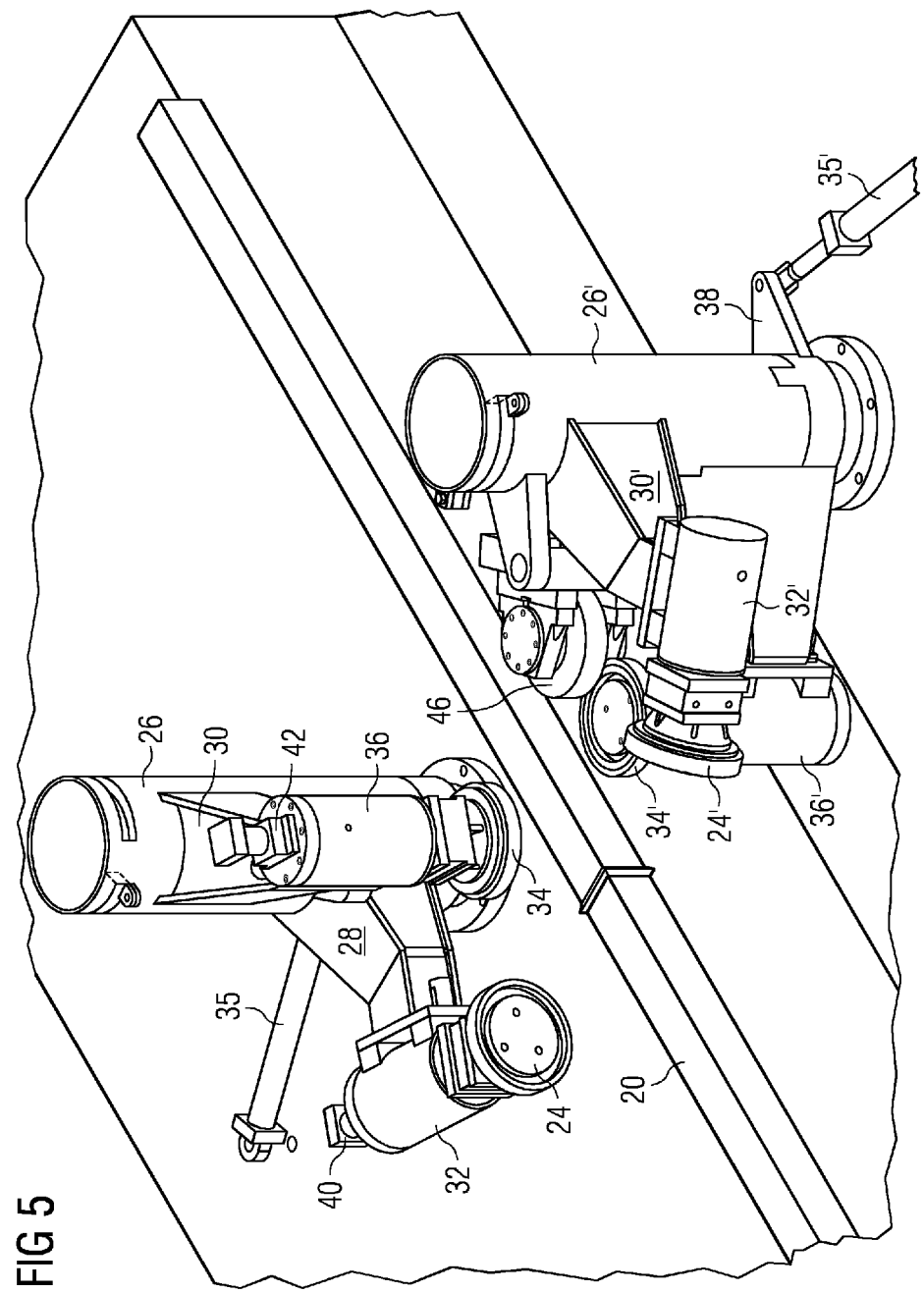
FIG. 5 is a view of the deburring assembly of FIG. 4 in a stand-by position.

FIG. 5 is a view of the deburring system shown in FIG. 4 in the stand-by position. As can be better seen in this figure, each external column 26, 26', comprises a fixed internal cylinder, and a rotatable external cylinder. The arms being fixed to the external cylinder and rotating with this cylinder.

The arms of a deburring apparatus 25, 25' are angularly spaced apart such that at the end of the rotation bringing the column from the stand-by position to the working position, both cutting disks 24, 34 or 24', 34' be located in the vicinity of the surface of the billet to be deburred, and almost parallel to said surface.

FIGS. 6 to 12 represent a second embodiment of a deburring apparatus according to the invention. In this embodiment, cleaning devices have been added to the previous embodiment. As this embodiment is similar to the previous one, only the difference will be now discussed in details.

Figure 6:
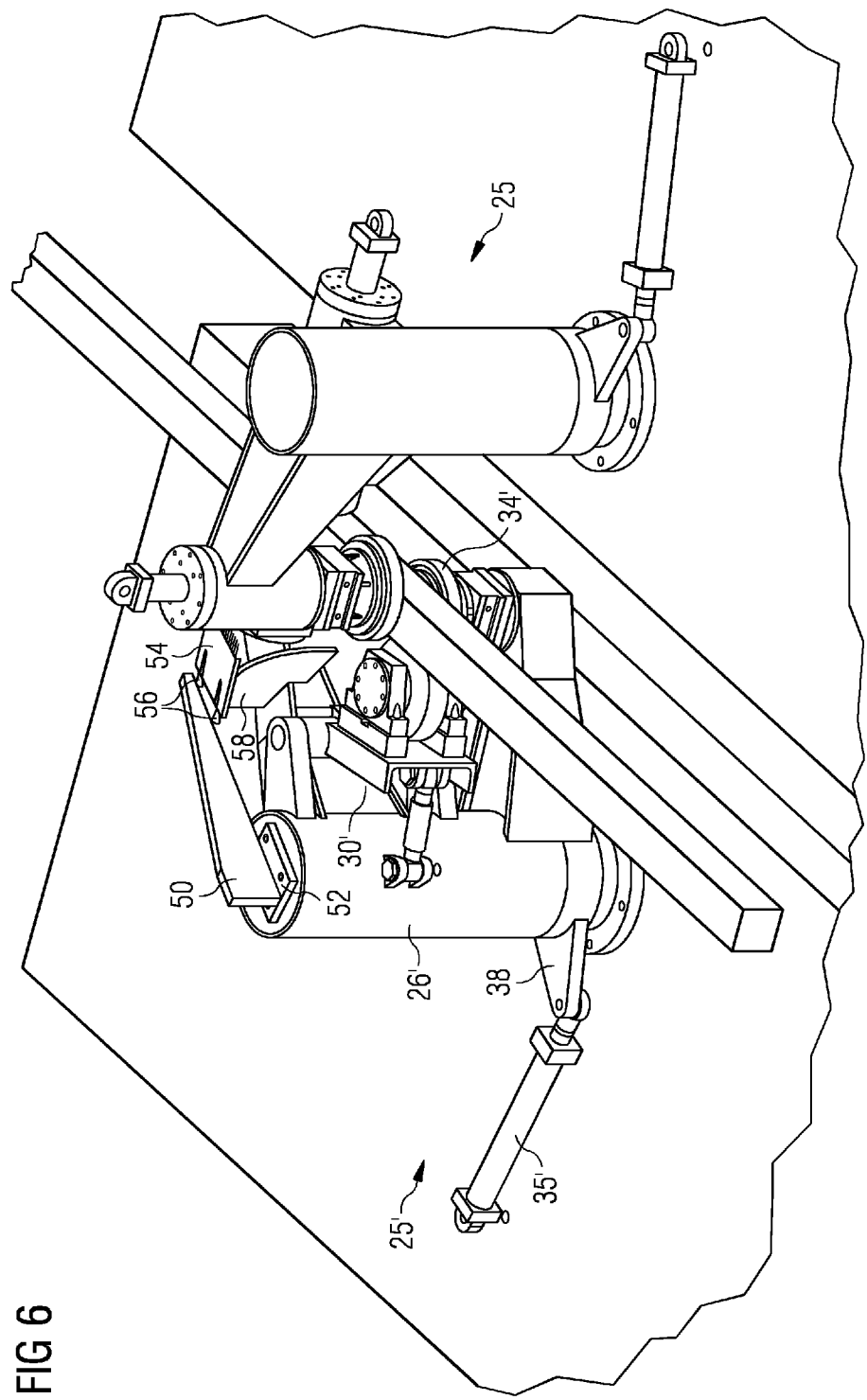
FIG. 6 is a tridimensional view of an assembly comprising two deburring apparatus according to a second embodiment of the invention, in a working position.
Figure 7:
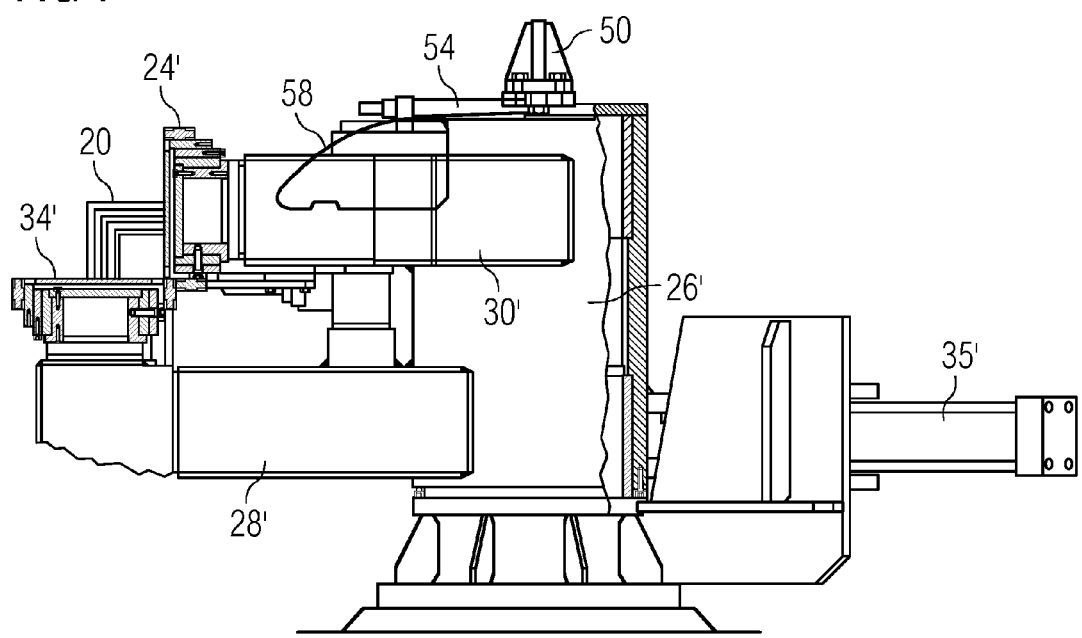
FIG. 7 is a cross section of a deburring apparatus of the assembly according to the second embodiment of the invention.

In this embodiment, and as can be seen in FIGS. 6 and 7, one of deburring apparatus 25', that will be called first deburring apparatus 25', is further provided with a supplemental cleaning arm 50 supporting a brush 54. The supplemental arm is fixed to the top of the column 26' (which does not move in rotation), by means of a flange 52. At the opposite extremity of the supplemental arm a brush 54 is provided. Two hinges link the brush to the cleaning arm such that the brush 54 can freely rotate about a horizontal axis. A vertical plate 58 is fixedly connected to the supporting arm 30'. The vertical plate has a disk portion shape with a rounded edge. This plate acts as a cam which moves the brush during rotation of the arm 30'. In the working position shown in FIG. 6 the plate maintains the brush in a horizontal position. When the hydraulic cylinder 35' pushes flange 38, column 26', supporting arm 30' and plate 58 rotate anti-clockwise. This provokes progressive rotation about a horizontal axis of the brush 54 from a horizontal position to a vertical position. The brush reaches its vertical position before the end of supporting arm 30' rotation and before the passage of the lower cutting disk 34'. Therefore brush 54 cleans disk 34' (by touching the disk 34') when the disk comes back to its stand-by position. In this way the brush cleans the metal chips accumulated during deburring from the surface of the cutting disk. When the cylinder pulls the flange 38 the process is reversed and plate 58 moves back brush 54 from vertical cleaning position to horizontal stand by position.

FIG. 7 also shows that the same deburring apparatus can deburr different type of billets 20 having different cross sections.

Figure 8:
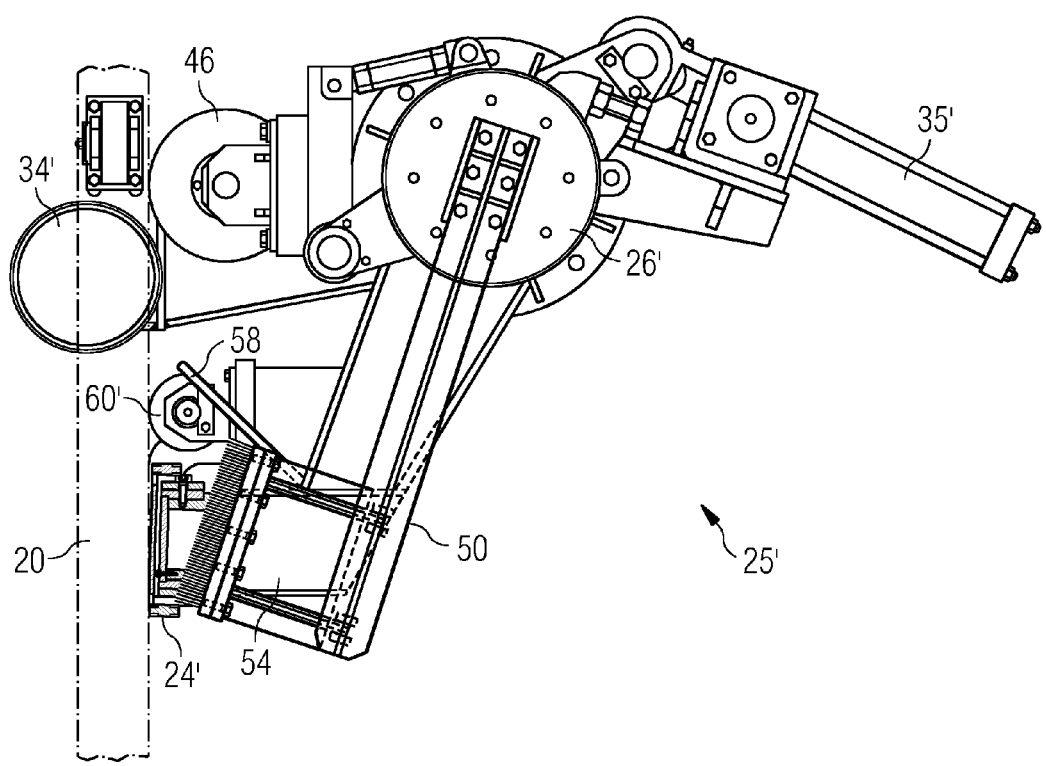
FIG. 8 is a top view of the apparatus shown in FIG. 7, in a working position.
Figure 9:
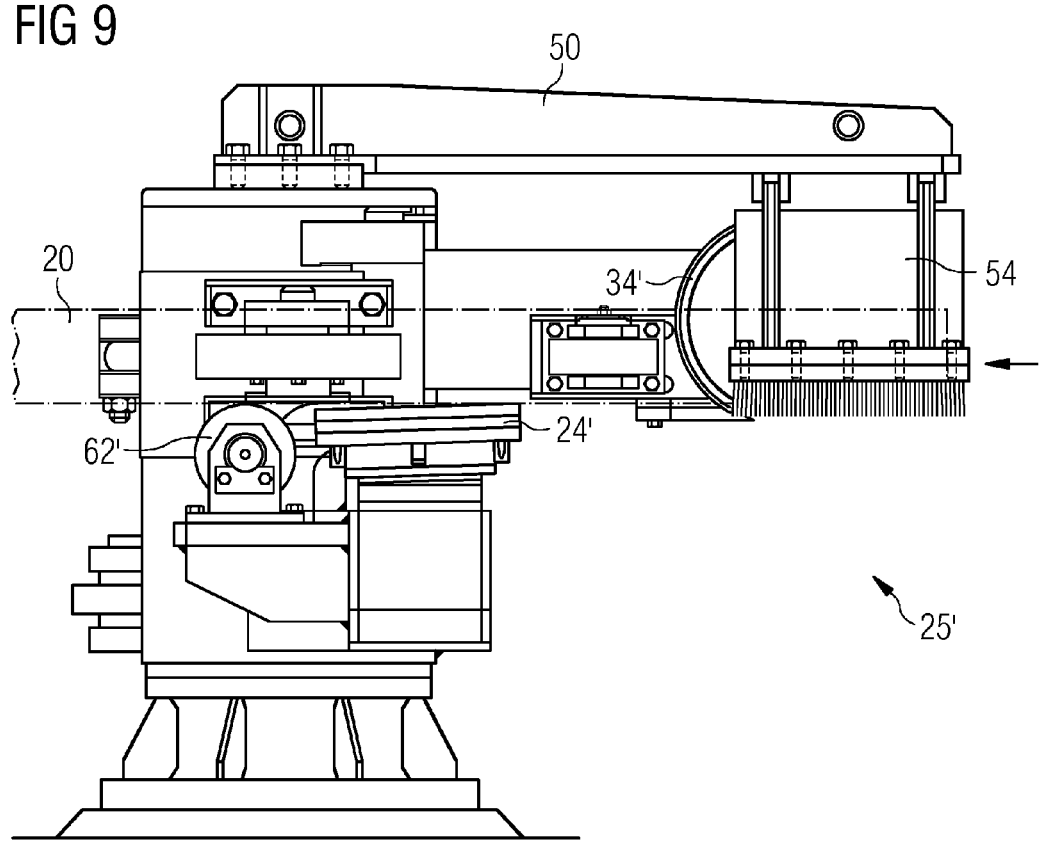
FIG. 9 is a size view of the apparatus shown in FIG. 7, in a stand-by position.
Figure 10:
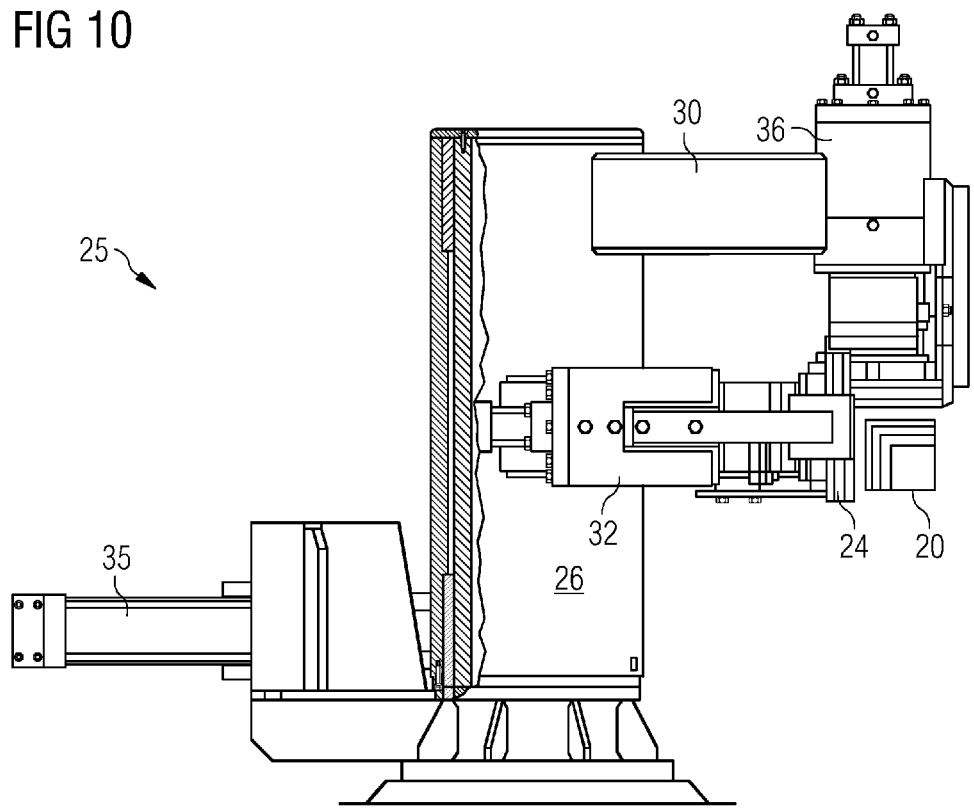
FIG. 10 is a cross section of another deburring apparatus of the assembly.

As represented on FIGS. 8 and 9, the first deburring apparatus 25' is provided with small first idle stoppage wheels 60', 62' attached to the cutting disks supports and rotating with the support about the axis of the column 26'. During rotation of the first apparatus 25', the stoppage wheel 60' or 62' and the corresponding cutting disk 24' or 34' contact the billet 20 at the same moment (this is because each stoppage wheel is located such that one of its tangent plane passes by the cutting point of the corresponding cutting disk. These first stoppage wheels 60', 62' also stop adjustment translation of the cutting apparatus of the opposite deburring apparatus (second deburring apparatus 25 in the present case). This is a supplemental security in case the translation adjustment of the opposite second deburring apparatus 25 goes too far. In this case, the adjustment translation means 40 or 42 pushes the opposite cutting disk 24 or 34 which in turn pushes the billet which will be stopped by the first stoppage wheels 60' or 62' of the first deburring apparatus. Each idle stoppage wheels 60', 62' has its axis almost parallel to the axis of the corresponding cutting disk 24' or 34' (the cutting disks 24' or 34' are slightly inclined as will be explained under). This means that the first deburring apparatus 25' is provided with a horizontal and a vertical stoppage wheels 60' or 62'.

Figure 11:
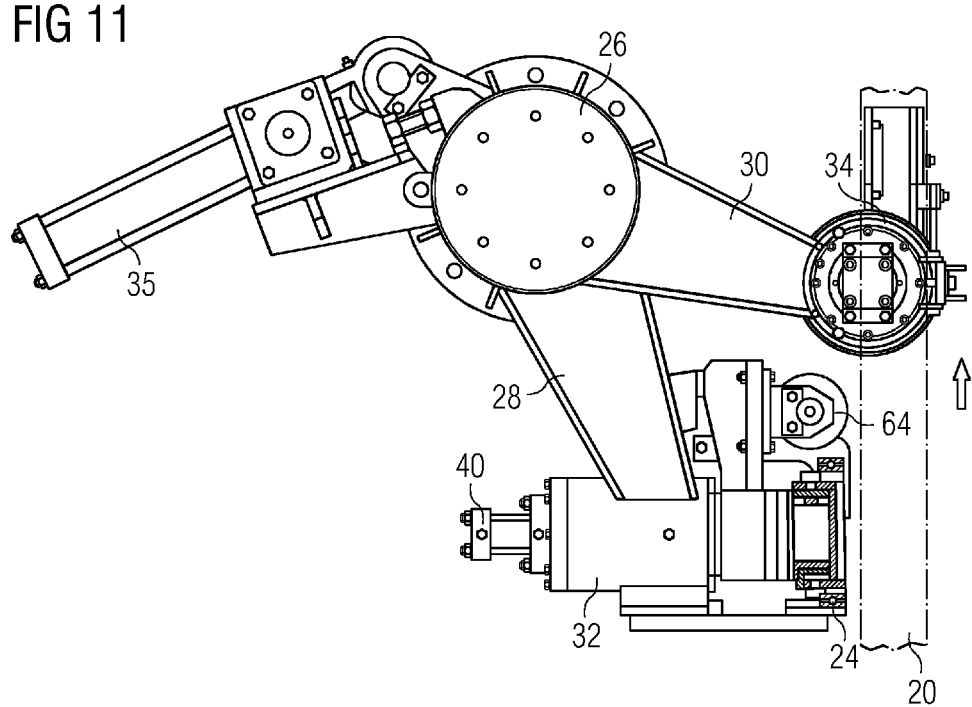
FIG. 11 is a top view of the deburring apparatus shown in FIG. 10 in a working position.
Figure 12:
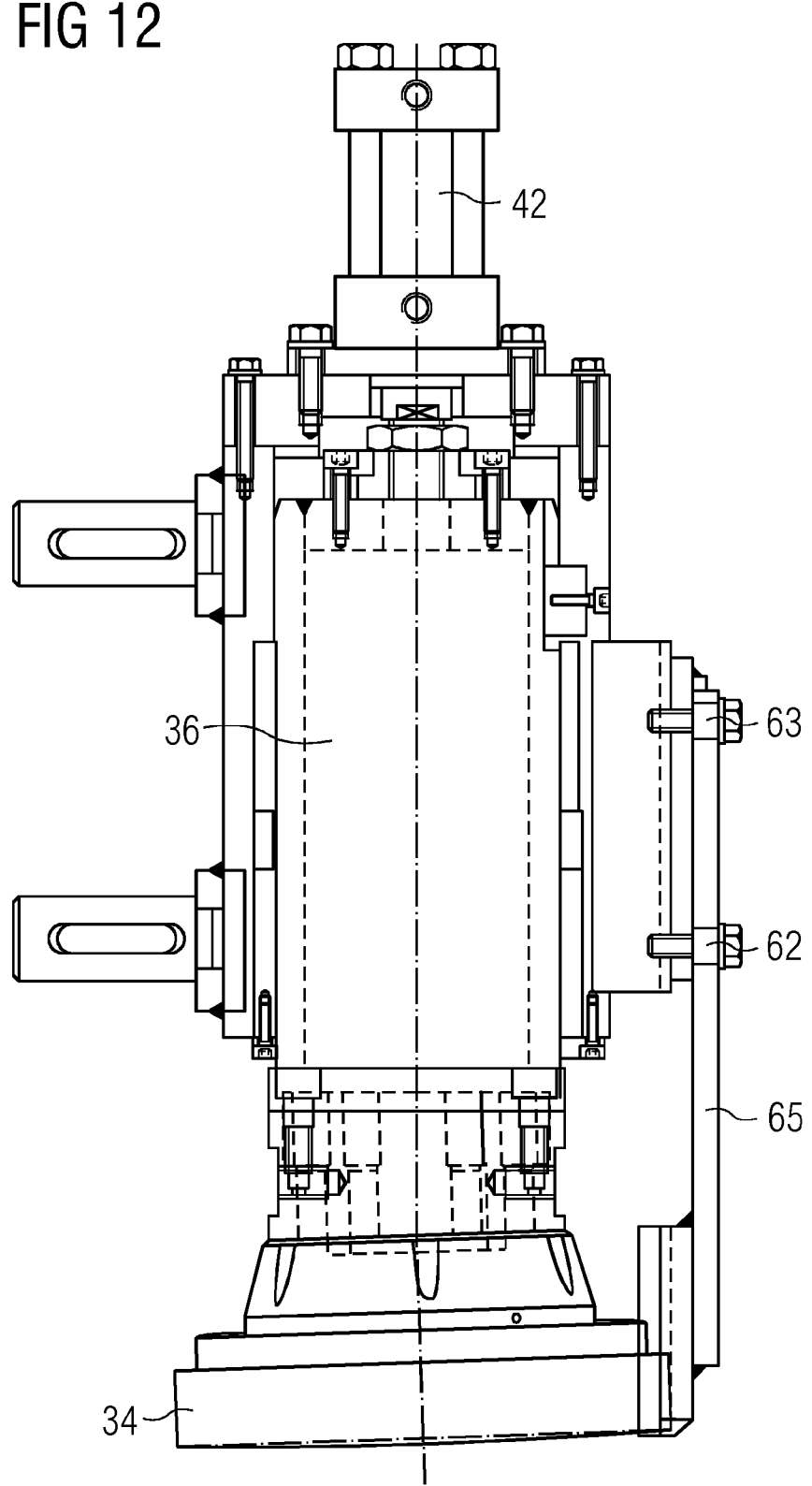
FIG. 12 is a front view of a sub-assembly of a deburring apparatus according to the invention showing a cleaning element of a cutting disk.

As can be seen on FIG. 11, the other deburring apparatus 25, that will called second deburring apparatus 25, is also provided with second small idle stoppage wheels 64 (only one wheel can be seen on the drawings) which indicates the exact location of the cutting extremity of the cutting edge of disks 24 or 34 (point E on FIG. 12). Each stoppage wheel 64 is linked to its corresponding cutting disk 24, 34 and translates with this cutting disk when an adjustment translation is applied. Each first stoppage wheel 64 has an axis almost parallel to the axis of its corresponding cutting disk 24 or 34 (the cutting disks 24 or 34 are slightly inclined as will be explained under). This means that the second deburring apparatus 25 is provided with a horizontal and a vertical stoppage wheel 64. During the adjustment translation, the stoppage wheel and the corresponding cutting disk contact the billet at the same moment and the stoppage wheel mechanically stops the adjusting translation at the best location for the burr cut (this is because each stoppage wheel is located such that one of its tangent plane passes by the cutting point of the corresponding cutting disk). Each stoppage wheels has also a security function because it stops the adjustment translation and avoids that the disks sink into the billet.

FIG. 12 is a longitudinal cross section of a cutting assembly of the second deburring apparatus 25. As can be seen on this figure, second deburring apparatus 25 further comprises cleaning scrapers 65 (although only one is shown in this figure it will be understood that the other cutting disk 24 is also provided with such a scraper). This cleaning scraper 65 is attached to the external part of the disk support

36 (by means of two screws 62, 63) and is fixed relative to this support. When the cutting disk is retracted by the hydraulic cylinder 42, the cleaning scraper 65 touches a portion the edge of the cutting disk 34 and cleans this portion from chips of metal stuck during deburring. Because the cutting disk is rotating during deburring, different portion of the cutting edge of the disk will contact the scraper 65 and will be cleaned.

On this figure it can also be seen that the cutting disk 34 is slightly inclined (for example 2°) relative to a horizontal plane. This is to cut the burr more efficiently and also to ensure that only a portion of the cutting disk (materialized by point E on FIG. 12) is in contact with billet and to avoid damaging the billet. This inclination applies for all the cutting disks of the first and second deburring apparatus 25 and 25'.

As the above description has shown the deburring apparatus according to the invention has the following advantages in view of the prior art solutions:

1) Costs savings:
the structure is very light and composed by less parts in comparison with prior art configuration, the burr cut is performed with 4 cutting means (one for each face of the billet) instead of 6 for the prior art solution. The total weight of the cutting means' supporting device has been reduced to approximately 4.3 tons from the 21 of the existing solution, the complexity of the system has been reduced as well.

2) No cooling system required:
according to the invention, the cutting means are moved away from the hot zone and shields (not shown on the figures) prevent thermal radiation, so no cooling system needed;

3) Simpler and quicker maintenance/change:
the cutting disks are easily accessible, demountable and handled;
maintenance operations are easier, quicker and feasible during normal production (without welding machine) because of the distance between the pass line and the disks (for example 700 mm);
possible manual intervention during waiting phases without rolling mill stop: it is possible for an operator to get close to the invention during stand-by phases 4) Easier visual inspection during cut and self cleaning operation:
in any position it is possible to see the disks;
the disk edges will be cleaned from any residual burr during motion after cut.

The invention claimed is:

1. An apparatus for removing burrs on billets, the billets traveling in a forward ground direction of a continuous rolling mill, the apparatus comprising:
a supporting element rotatably mounted about an axis extending upwardly from the ground of the rolling mill;
at least two arms extending from said supporting element;
deburring devices supported by said at least two arms and configured to be driven in rotation by the burrs of the billets;
a drive for rotatably and reversibly driving the apparatus about the axis of said supporting element extending upwardly from a base of the rolling mill, between a stand-by position, wherein the apparatus is spaced apart from the billet to be deburred, and a working position, wherein the deburring devices are close to the billet to be deburred and are able to contact a respective burr.

2. The apparatus according to claim 1 wherein said deburring devices comprise:
at least one horizontal idle cutting disk; and
at least one vertical idle cutting disk.

3. The apparatus according to claim 2, wherein a diameter of each said disk is greater than a width of a face of the billet to be deburred by each said disk and wherein, in the working position, a rotary axis of each said disk is laterally offset from a line extending from a first point of contact between said disk and the respective burr of the billet parallel to the direction of movement of the billets.

4. The apparatus according to claim 3, wherein the diameter of each said disk is at least two times greater than the width of the face of the billet to be deburred.

5. The apparatus according to claim 3, wherein the diameter of each said disk is between 2 and 3.5 times the width.

6. The apparatus according to claim 1, wherein said arms are angularly spaced apart from one another such that, at an end of a rotation bringing the apparatus from the stand-by position to the working position, said deburring devices are located in a vicinity of a surface of the billet to be deburred, and substantially parallel to said surface.

7. The apparatus according to claim 1, which further comprises means for indicating an exact position of a point of said deburring devices that will first be in contact with the burr and for stopping a motion of a cutting device.

8. The apparatus according to claim 7, wherein each said indicating means comprises an idle stoppage wheel adapted to contact the billet.

9. The apparatus according to claim 1, wherein each said deburring device is slightly inclined relative to a face of the billet to be cleaned by the respective deburring device such that only a portion of a cutting device contacts the burr.

10. The apparatus according to claim 1, which further comprises translating devices for translating each said deburring device in a direction transverse to a travelling direction of the billet, for adjusting a position of the deburring devices relative to a potential burr.

11. The apparatus according to claim 1, which further comprises a cleaning scraper attached to an external portion of a cutting disk support, said scraper being adapted to touch a portion of an edge of one deburring device for cleaning the portion from chips of metal that got stuck during deburring.

12. The apparatus according to claim 1, which further comprises a cleaning brush attached to a cleaning arm secured to said supporting element, said brush being pivotable between a horizontal stand-by position and a vertical cleaning position wherein said brush is in a position to clean a deburring device.

13. The apparatus according to claim 12, wherein said cleaning device further comprises a plate secured to one of said arms and configured to rotate with said arm when the apparatus moves from the stand-by to the working position and from the working position to the stand-by position, said plate touching said cleaning brush, and a rotation of said plate provoking a pivoting of said brush between said two positions.

14. The apparatus according to claim 1, which further comprises a stopping device for stopping an accidental rotation of the apparatus provoked by an adjusting motion of deburring devices of another deburring apparatus, said stopping device being disposed to contact the billet when the apparatus is in working position.

15. The apparatus according to claim 14, wherein said stopping device comprises a stoppage wheel.

16. The apparatus according to claim 15, wherein said stoppage wheel is attached to said supporting element and is disposed and adapted to contact the billet in case of an accidental rotation.

17. A deburring assembly for removing burrs on billets, the assembly comprising:
  a first deburring apparatus according to claim 1; and
  a second deburring apparatus according to claim 1.

* * * * *